(12) United States Patent
Schmitt et al.

(10) Patent No.: US 11,630,371 B2
(45) Date of Patent: Apr. 18, 2023

(54) MULTIFUNCTIONAL OPTICAL FILTERS

(71) Applicant: HAMR Industries LLC, State College, PA (US)

(72) Inventors: Michael P. Schmitt, Houston, TX (US); Douglas E. Wolfe, State College, PA (US)

(73) Assignee: HAMR Industries LLC, Clinton, PA (US)

( * ) Notice: Subject to any disclaimer, the term of this patent is extended or adjusted under 35 U.S.C. 154(b) by 0 days.

(21) Appl. No.: 17/564,302

(22) Filed: Dec. 29, 2021

(65) Prior Publication Data

US 2022/0206359 A1 Jun. 30, 2022

Related U.S. Application Data

(60) Provisional application No. 63/131,846, filed on Dec. 30, 2020.

(51) Int. Cl.
*G02F 1/35* (2006.01)

(52) U.S. Cl.
CPC .......... *G02F 1/3523* (2013.01); *G02F 1/3503* (2021.01)

(58) Field of Classification Search
None
See application file for complete search history.

(56) References Cited

U.S. PATENT DOCUMENTS

| | | |
|---|---|---|
| 6,859,483 B1 | 2/2005 | Boucher et al. |
| 6,947,218 B2 | 9/2005 | Turner, III |
| 7,319,560 B2 | 1/2008 | Gunning et al. |
| 9,244,208 B2 | 1/2016 | Hillmer et al. |
| 9,692,517 B1 | 6/2017 | Sprem et al. |
| 2004/0042083 A1* | 3/2004 | Turner, III ............ G02B 5/284 359/578 |
| 2009/0220189 A1 | 9/2009 | Kiesel et al. |
| 2014/0154769 A1 | 6/2014 | Del et al. |
| 2015/0378243 A1 | 12/2015 | Kippelen et al. |
| 2017/0180051 A1 | 6/2017 | Sprem et al. |
| 2022/0206359 A1* | 6/2022 | Schmitt ................. G02F 1/3503 |

OTHER PUBLICATIONS

International Search Report issued in International Patent Application No. PCT/US2021/065424 dated Apr. 21, 2022.
Li, et al., "Giant two-photon absorption in monolayer MoS2", Laser & Photonics Rev., vol. 9, Issue 4, pp. 427-434, Jul. 2015.
(Continued)

*Primary Examiner* — Rhonda S Peace
(74) *Attorney, Agent, or Firm* — BakerHostetler

(57) ABSTRACT

An optical filter includes a substrate; a first mirror on the substrate; a cavity layer on the first mirror; and a second mirror on the cavity layer. Each of the first and second mirrors provide high reflection, low transmission and low absorption over a targeted stopband. The cavity layer defines a resonant transmission band within the targeted stopband with the resonant band wavelength depending on the optical thickness of the cavity layer. The cavity layer includes a material having a non-linear response to incident irradiance such that cavity absorption changes with irradiance and suppresses cavity resonance at high irradiance. The material having the non-linear response to the incident irradiance includes a two-dimensional (2D) material.

20 Claims, 12 Drawing Sheets

(56) References Cited

OTHER PUBLICATIONS

Makri, et al., "Non-Linear Localized Modes Give Rise to a Reflective Optical Limiter", Optics (physics.optics), pp. 1-5 2013.
Vella, et al, "Experimental realization of a reflective optical limiter", Phys. Rev. Applied, vol. 5, pp. 064010-1-064010-07, Jun. 2016.
Zhang, et al., "Direct Observation of Degenerate Two-Photon Absorption and Its Saturation in WS2 and MoS2 Monolayer and Few-Layer Films", ACS Nano 2015, vol. 9, No. 7, pp. 7142-7150, Jul. 2, 2015.

* cited by examiner

MULTIFUNCTIONAL OPTICAL FILTERS

CROSS-REFERENCE TO RELATED APPLICATION

This application claims the benefit of U.S. Provisional Application No. 63/131,846 filed 30 Dec. 2020, the entire disclosure of which is hereby incorporated by reference herein.

STATEMENT REGARDING FEDERALLY SPONSORED RESEARCH

This invention was made with government support under Contract No. W15QKN-19-C-0009 awarded by the United States Army. The Government has certain rights in the invention.

BACKGROUND

Technical Field

The present application relates to an optical filter, and more particularly, to a non-linear filter that provides a response that changes based on the irradiance.

Discussion of the Related Art

Optical filters are used to provide transmission of a selected wavelength region while preventing transmission of near or surrounding wavelength regions. These filters can be used for many applications including networking and optical communication, safety, protection or limiting, and optical calibration. Non-linear filters yield an output that is not a linear function of the input, e.g. the transmission is not a direct function of the irradiance. Tailoring the non-linearity enables control of the filtered signal intensity. When combined with a Fabry-Perot structure, this can yield an increase in transmission intensity (gain), or reduction in transmission intensity (loss), depending on the device design. A Fabry-Perot structure therefore enables a multifunctional device that can provide not only a reflective surface but an intensity-controlled passband.

However, a continuing need exists for optical filters that have a response that changes based on the incident irradiance.

SUMMARY

The present disclosure is directed to an optical filter that substantially obviates one or more of the problems due to limitations and disadvantages of the related art.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the disclosure, as embodied and broadly described, an optical filter comprises a substrate; a first mirror on the substrate; a cavity layer on the first mirror; and a second mirror on the cavity layer, wherein each of the first and second mirrors provide high reflection, low transmission and low absorption over a targeted stopband, wherein the cavity layer defines a resonant transmission band within the targeted stopband with the resonant band wavelength depending on the optical thickness of the cavity layer, wherein the cavity layer includes a material having a non-linear response to incident irradiance such that cavity absorption changes with irradiance and suppresses cavity resonance at high irradiance, and wherein the material having the non-linear response to the incident irradiance includes a two-dimensional (2D) material.

In another aspect, an optical filter comprises a substrate; a first mirror on the substrate; a cavity layer on the first mirror; and a second mirror on the cavity layer, wherein each of the first and second mirrors provide high reflection, low transmission, and low absorption over a targeted stopband, wherein the cavity layer defines a resonant transmission band within the targeted stopband with the resonant band wavelength depending on the optical thickness of the cavity layer, and wherein the cavity layer includes a plurality of layer comprising: a non-linear layer having a thickness less than a wavelength of the targeted stopband, the non-linear layer comprising a material having a non-linear response to incident irradiance such that cavity absorption changes with irradiance and suppresses cavity resonance at high irradiance, and the material having the non-linear response to the incident irradiance is a two-dimensional (2D) material, and outer layers respectively on opposing sides of the non-linear layer.

In another aspect, an optical filter comprises a substrate; a first mirror on the substrate; a first cavity layer on the first mirror; a second mirror on the cavity layer; and a second cavity layer on the second mirror; a third mirror layer on the second cavity layer, wherein each of the first, second, and third mirrors provide high reflection, low transmission, and low absorption over a targeted stopband, wherein the first and second cavity layer define first and second resonant transmission bands, respectively, within the targeted stopband with a resonant band wavelength of each of the first and second resonant transmission bands depending on the optical thickness of the first and second cavity layers, respectively, wherein the first and second cavity layers respectively include first and second materials each having a non-linear response to incident irradiance such that cavity absorption changes with irradiance and suppresses cavity resonance at high irradiance, and wherein each of the first and second materials having the non-linear response to the incident irradiance includes a two-dimensional (2D) material.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
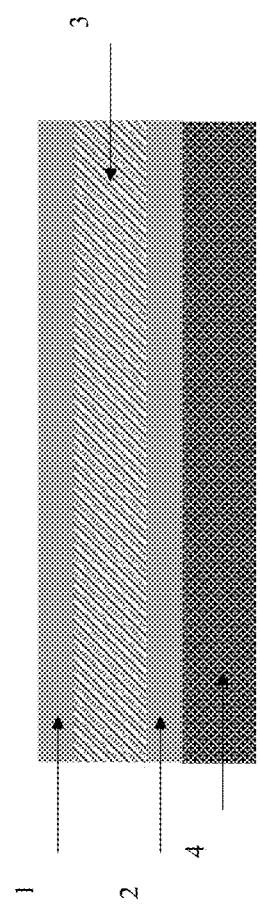
FIG. 1 is a schematic cross section of a generic intensity dependent non-linear optical filter in accordance with an example embodiment of the present disclosure.

Example aspects of the present disclosure provide a multifunctional Fabry-Perot filter that yields an embedded passband within a reflective band, wherein the passband transmission behavior changes as a function of irradiance. Further, multiple passbands can be embedded to yield a multi bandpass filter capable of transmitting two or more signals while maintaining intensity filtering behavior. Example embodiments may utilize a combination of novel materials and structural design to provide an advantageous multifunctionality not capable in any other individual bandpass filter.

Fabry-Perot filters have a pair of planar mirrors surrounding a cavity layer. The mirrors can be composed of metallic reflectors, dielectric stacks, or gradient index films, among others, and reflect light over a particular wavelength regime. Often, distributed Bragg reflectors (DBRs) are used for the mirrors due to their high degree of tailorability. DBRs are composed of quarter wave plates of alternating high- and low-index materials. In a DBR, the center of the reflective regime ($\lambda_c$) can be approximated by:

$$\lambda_c = 2(\eta_a l_a + \eta_b l_b)\frac{1}{m}; m = 1, 2, 3 \ldots \quad \text{Eqn. 1}$$

where $\eta_a$ and $\eta_b$ represent the refractive indices of the two layers, $l_a$ and $l_b$ their corresponding thicknesses, and m represents an integer. The bandwidth ($\Delta\lambda$) of the DBR is likewise dependent on the dielectric layers and be approximated by:

$$\Delta\lambda = \lambda_c \frac{4}{\pi}\sin^{-1}\left(\frac{\eta_a - \eta_b}{\eta_a + \eta_b}\right) \quad \text{Eqn. 2}$$

Finally, the reflectivity, R, can be approximated by:

$$R = \left(\frac{\eta_{air}\eta_a^{2N} - \eta_{sub}\eta_b^{2N}}{\eta_{air}\eta_a^{2N} + \eta_{sub}\eta_b^{2N}}\right)^2 \quad \text{Eqn. 3}$$

where N is the total number of bilayer pairs, and $\eta_{air}$ and $\eta_{sub}$ are the refractive indices of the incident material and underlying material, air and substrate respectively, in this example. To produce a high reflectivity DBR with a large bandwidth, refractive index contrast and number of bilayers should be maximized. These factors are somewhat limited in practice by material properties, compatibility, and overall system complexity and fabricability. In addition to these factors, the angle of impingement and polarization also play a role in the overall behavior and performance of the reflectors.

The cavity layer is sandwiched between the reflectors and functions as the resonating layer. For wavelengths in which the cavity layer thickness is an integer multiple of the optical half wavelength, resonance occurs and the signal is amplified. Given sufficient amplification, the single wavelength can be transmitted through the otherwise reflective structure. The transmission wavelength ($\lambda_T$) is approximated by:

$$m\lambda_T = 2\eta_c l_c \sin(\theta) \quad \text{Eqn. 4}$$

where $\eta_c$ is the refractive index of the cavity layer, $l_c$ is the thickness of the cavity layer, and $\theta$ is the angle of light in the cavity layer with 90° representing normal incidence. This transmission is shifted to shorter wavelengths as $\theta$ decreases. From Snell's law, the refracted angle can be reduced when transitioning to higher index materials, and thus this may be desired for a cavity layer. Fabry-Perot filters may be used for applications, such as vertical cavity surface emitting lasers (VCSELs), imaging, and optical networking. A drawback of traditional Fabry-Perot structures is the inability to filter multiple wavelengths. Further, tunable filters may enable varying of the transmission band, but their operation relies on physical manipulation of the device to shorten or lengthen the cavity thereof, which is not suitable for a passive device or coating application.

A non-linear filter can be fabricated by incorporating non-linear optical materials or materials which produce a non-linear response in the optical behavior of the complete structure. The non-linear response can be caused by intrinsic mechanisms, such as harmonic generation, two photon absorption, three photon absorption or photoconductivity, as well as extrinsic effects, such as heating or applied force, among others. For example, in second harmonic generation two photons combine to form a single photon having double the energy or frequency. This effect is often referred to as frequency doubling and becomes more pronounced at higher irradiances and therefore yields a non-linear response. When utilizing materials that produce a non-linear response in the cavity layer of a Fabry-Perot filter, the resonant transmission behavior can therefore change as a function of irradiance, which may be useful in a multifunctional filter.

As such, multifunctional bandpass filters that are capable of providing not only tailorable reflection bands and bandpass wavelengths may be desired, but also providing intensity filtering and the ability to simultaneously filter multiple bands when necessary.

Many applications utilizing filters, particularly Fabry-Perot type devices, involve optical tuning for a particular wavelength region. Few consider intensity or multiband transmission. An intensity controlled Fabry-Perot structure utilizing non-linear material may rely on bulk non-linear materials, such as GaAs, a material with known non-linearity. Much larger two-photon absorption has been observed in novel materials that exhibit two-dimensional (2D) structures, such as $WS_2$, $MoS_2$, graphene, and BN, among others. For example, 2D materials useful for optical filters of the present disclosure can comprise one or more of, or a mixture of, a transition metal dichalcogenide (TMC), e.g., $ME_2$ (where M is a transition metal and E is a chalcogenide, e.g., S, Se, and/or Te) such as $WS_2$, $MoS_2$, a solid solution of a TMD, e.g., $M'_xM_yE_2$ (where M' and M represent different transition metals, E represents a chalcogenide and x and y sum to one), a non-linear organic material, BN, a borocarbonitride (e.g., a borocarbonitride having general formula of $B_xC_yN_z$, where x, y, and z indicate a relative amount of each element compared to the others and where x, y, and z sum to one), or a carbonaceous material. An example carbonaceous material can include a graphene-based carbonaceous material.

Properties of select 2D materials are advantageous in non-linear optical applications, such as a non-linear material layer of the cavity layer in accordance with embodiments hereof. For such a non-linear layer, the thickness may be less than a wavelength of a targeted resonance. As such, 2D materials with non-linear optical properties can be used for the non-linear material layer.

2D Materials may be characterized by a periodic arrangement and bonding (e.g., a lattice arrangement and bonding) in substantially one plane or other arrangement describable as two dimensional and lack of strong bonding in the out-of-plane direction. Thus, a 2D material exhibits only weak bonding, for example, van der Waals bonding, in the out-of-plane direction. Such 2D materials can be in the form of a single layer of atoms (e.g., a single layer of carbon—graphene) or single layer of a compound (e.g., a single layer of $WS_2$). Further, such 2D materials can be in the form of multiple layers such that the layers exhibit only weak bonding in the out-of-plane direction with adjacent layers of the 2D material. Different 2D materials can also be stacked on each other. Therefore, unique properties of such 2D materials may be achieved. For example, the lack of strong three-dimensional bonding results in extremely anisotropic properties and unique behaviors that are not observed in traditional bulk, three-dimensionally bonded materials. As more layers are added, the materials will eventually approach bulk behavior, where the thickness required to approach bulk behavior is often gradual and strongly material dependent. As such, the thickness of a non-linear layer comprising a 2D material is less than the thickness in which the material exhibits bulk behavior. Generally, the thickness of the non-linear layer would be about 1 μm or less, e.g., between about 1 Å and up to about 1 μm. For example, the thickness of the non-linear layer can range from about 1 nm to up to several tens or hundreds of nm (e.g., up to 20, 40, 60, 80, 100, 300, 500 or 700 nm, etc.). The lack of bonding in the out-of-plane direction results in unique properties in certain 2D materials, such as large in-plane tensile strengths, thermal conductivities, and electrical conductivities, novel magnetic properties, and anomalous optical properties, often orders of magnitude better than the best-in-class bulk materials.

The non-linear absorption coefficients (β), which may be a two-photo absorption (TPA) coefficient, of such materials have been shown to be orders of magnitude larger than materials, such as GaAs, that exhibit bulk non-linear behavior. Here, the nonlinear absorption coefficient can be at least one or two orders of magnitude larger than that of traditional bulk materials in the wavelength ranges of interest (e.g., larger than $1 \times 10^2$ cm/GW or larger than $1 \times 10^3$ cm/GW). For example, β for GaAs is typically in the range of 23 cm/GW. However, $WS_2$ in a 2D material structure can be as high as about $1 \times 10^5$ cm/GW (approximately 4 orders magnitude larger than the β for GaAs). Other materials with similar 2D material structures have exhibited correspondingly large β values, typically several orders of magnitude more than traditional non-linear absorbers. The drastic increase in non-linearity of these novel materials is ascribed in part to a 2D confinement mechanism. This mechanism is not present in traditional non-linear materials whose crystal structures do not possess the same degree of anisotropy and 2D behavior. Thus, the class of 2D materials are mechanistically different from traditional non-linear materials and provides a novel mechanism for larger non-linearities.

In accordance with embodiments of this disclosure, the 2D materials should have structures that exhibit non-linear optical properties. For example, the 2D materials useful for the optical filters of the present disclosure have non-linear absorption coefficients (β) of at least $10^2$ cm/GW, e.g., at least $10^3$ cm/GW or higher in their monolayer state.

Incorporating the 2D confinement mechanism and exciton effects of 2D materials into a Fabry-Perot type structure can enable a large dynamic range, or ratio of maximum observable power (damage threshold) to minimum power needed to suppress resonance and reduce transmission (limiting threshold). This yields a much stronger intensity filter than that described elsewhere, and therefore enables usage new applications, such as high energy beams, high power optical communication and filtering, and lab safety. In addition, incorporation of 2D materials in optical filters of the present disclosure enable flexibility in the cavity layer design. Half-wave integer multiple cavities can be modified to include a thin layer of the 2D material in a pseudo quantum well structure, similar to that of cavity emitting lasers. The large non-linearity of the 2D materials is sufficient to suppress the cavity mode within the larger cavity layer, eliminating the need for the entire cavity layer to exhibit non-linearity, thereby opening the range of materials utilized in the cavity, and resultantly, the capabilities of the device.

Another aspect achieved by embodiments of the present disclosure is the potential for multiband transmission. Incorporation of carefully designed multi-cavity systems can enable transmission of multiple wavelengths within the reflective band, e.g., multiple pass bands to enable further multifunctionality or improved device performance. Some multiband bandpass filters have utilized individual cavities spatially separated in the x-y plane of the device with z being the through thickness direction. In comparison, embodiments of the present disclosure may utilize cavities that are sequential in the z-direction and spatially uniform. This enables transmission of the cavities at any x-y location on the surface and therefore larger signal collection, though at the expense of spatial resolution.

An example embodiment to achieve such behavior can be achieved by a structure, for example, as shown in FIG. 1. In the example of FIG. 1, a pair of nominally planar reflectors 1 and 2, which sandwich a cavity layer 3, are deposited on a substrate 4. The reflectors 1 and 2 may be metallic, dielectric stacks, gradient index or rugate coatings, or other suitable structures or combinations thereof, and are selected and/or tailored to operate over the desired spectrum. The mirrors can be identical in their thickness, composition, and target reflectance bands, or can differ in any of such categories, depending on the desired overall bandwidth, band structure and performance goals of the device. The mirrors may have high reflectivity and low absorption in the targeted regime, e.g., wavelength range. High reflectivity can be in the range of 90 to >99.9%; low absorption can be in the range of 10 to <0.1% and the targeted wavelength range or stopband can be from 1000 to 2000 nm, for example. The mirrors can generally be tailored from nominally 150 nm wavelengths (UV) to 14 µm wavelengths (LWIR) while maintaining high reflectivity. For example, the targeted wavelength range or stopband can be tailored to correspond to ultraviolet, visible, and/or infrared, including far ultraviolet (10-200 nm), middle ultraviolet (200-300 nm), near ultraviolet (300-400 nm), visible (400-750 nm), near infrared (0.75-1.4 µm), short wave infrared (1.4-3 µm), mid-infrared (3-8 µm), long wave infrared (8-15 µm), far infrared (15-1000 µm), sub-portions thereof and/or combinations thereof. It is generally desired to maximize reflection and minimize absorption within the desired spectral range. Additional factors include thermochemical and thermomechanical compatibility, costs, scalability, and ease of fabrication. The cavity layer thickness $l_c$ is described by Eqn. 4 and is effectively an integer multiple of the optical half-wavelength of the target transmission wavelength $\lambda_T$ for a target incident angle $\theta$. The cavity material may have very low absorption at the target wavelength to facilitate resonance and prevent damage. In addition, the material may provide a non-linear response with respect to irradiance and exhibits a low (for example, near zero) linear absorption in the target wavelength regime. The non-linear response can arise from any of the examples provided in this disclosure or other examples understood by those skilled in the art. At low levels of irradiance, the absorption of the cavity layer is nominal and resonance occurs at the target wavelength. As irradiance increases, the absorption of the non-linear material increases, which suppresses the resonance within the cavity and eliminates transmission. This enables a multifunctional filter that can filter both wavelength and intensity. The structure is fabricated onto the substrate 4, using any combination of deposition techniques, such as electron beam-physical vapor deposition (EB-PVD), sputtering and any variation of sputtering, such as DC magnetron sputtering, high power impulse magnetron sputtering (HiPIMS), RF sputtering, reactive sputtering, or ion beam sputtering, cathodic arc deposition, plating (electro- and electroless) chemical vapor deposition (CVD) and any variation, including energy enhanced processes, such as plasma enhanced CVD, and laser CVD, plasma spray physical-vapor deposition (PS-PVD), atomic layer deposition (ALD), molecular beam epitaxy (MBE), or any other suitable technique for the fabrication of the various layers.

Figure 2A:
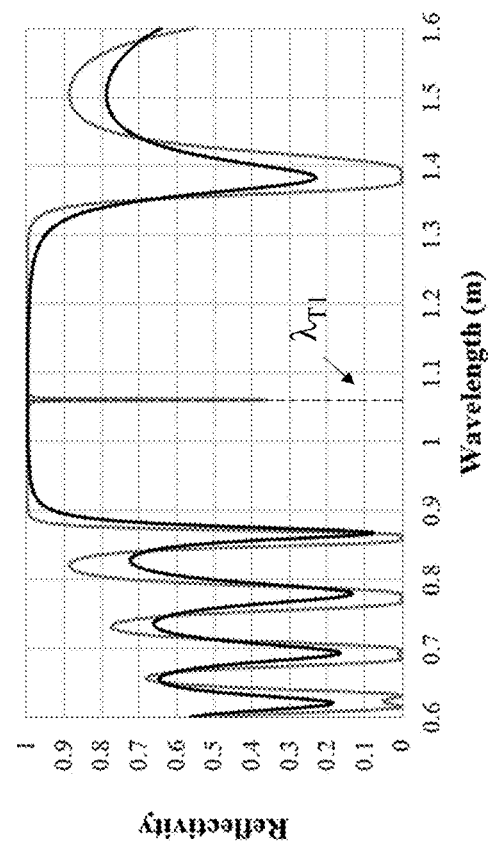
FIGS. 2a and 2b are a reflectivity spectra for a Fabry-Perot device and an example embodiment in accordance with the present disclosure, both at nominally low and high irradiance.
Figure 2B:
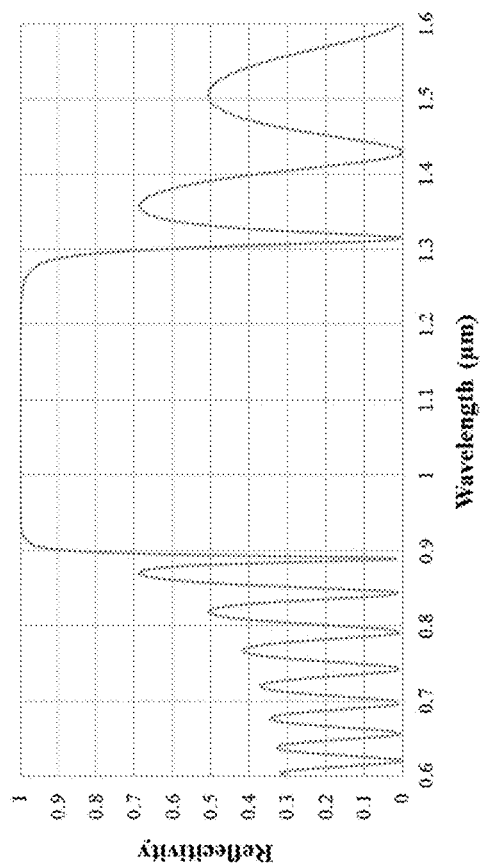

FIG. 2 is a reflectivity spectrum for a Fabry-Perot device and an example embodiment in accordance with the present disclosure, both at nominally low and high irradiance. Here, portion (a) of FIG. 2 provides a reflection spectrum for a typical Bragg reflector type structure, with portion (b) of FIG. 2 showing reflection spectra for a non-linear Fabry-Perot device targeting the same wavelength at nominally "low" and "high" irradiances, respectively. The basic Fabry-Perot structure enables transmission within the reflection band as shown in FIG. 2b, with transmission shown at $\lambda_{T1}$. This transmission is enabled by formation of a strong resonance in the cavity layer. The incorporation of material that provides a non-linear response in the cavity layer enables the suppression of this resonance at high irradiance, and therefore suppression of transmission at $\lambda_{T1}$, as shown in portion (b) of FIG. 2.

Figure 3:
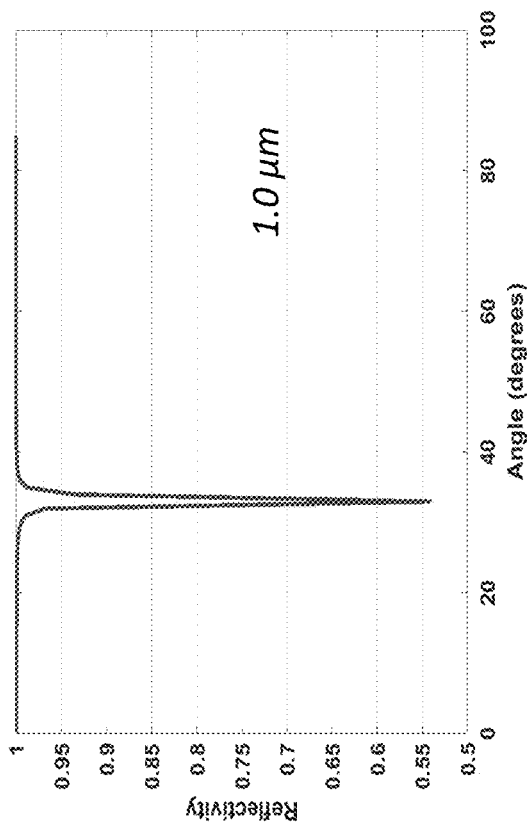
FIG. 3 is a reflectivity spectrum for an example embodiment in accordance with the present disclosure at a constant wavelength and given as a function of angle of incidence.

A benefit of the described structure is the ability to maintain high reflectivity over large angle sweeps, as shown in FIG. 3 where the reflectivity is plotted as a function of incident angle at a 1 µm wavelength, with $\theta=0$ representing normal impingement in this case. The device is targeted at a 1060 nm transmission, and so reflectivity of the 1 µm wavelength is high over the majority of the angular sweep. There is a small passband between 30°-40° that is the point at which the combination of cavity thickness and angle satisfy Eqn. 4 for the 1 µm wavelength. Another benefit and important distinction for this device is that it relatively polarization agnostic and exhibits nominally minor changes for most typical polarization states (TE, TM, ±° 45 TE/TM, circular, elliptic).

Figure 4:
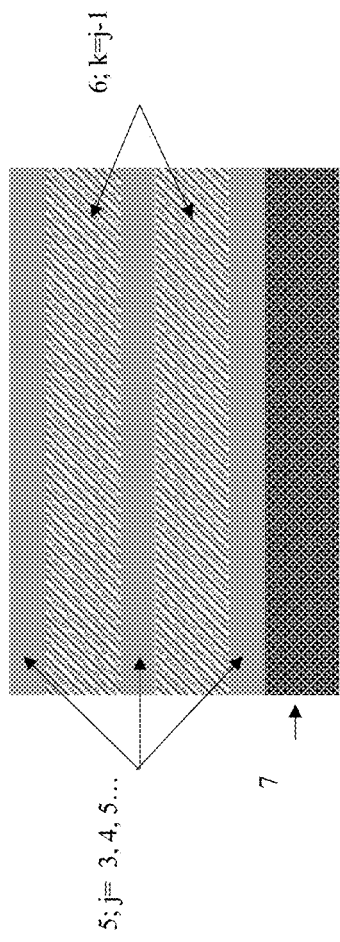
FIG. 4 is a schematic cross section of a generic intensity dependent non-linear optical filter with multiband transmission in accordance with an example embodiment of the present disclosure.

In addition to the basic structure provided in FIG. 1, more complex structures can be fabricated. One example modification involves fabrication of a multiband filter whose structure is provided in FIG. 4. The structures includes j number of mirrors 5 sandwiching k number of cavity layers 6, where k=j−1, all fabricated on top of a substrate 7. The mirrors may again include metallic, dielectric stacks, gradient index or rugate coatings, or other suitable structures or combinations thereof, and are selected and/or tailored to operate over the desired spectrum. The mirrors can be identical in their thickness, composition, and target reflectance bands, or can differ in any of said categories, depending on the desired overall bandwidth, band structure, and performance goals. Likewise, the cavity layers are tailored to the desired wavelength and are of a nominal $l_{c,i}$ thickness, where c,i is the target thickness for the $i^{th}$ cavity. In this manner, multiple cavity layers can be utilized to enable transmission of multiple wavelengths, at varying angles, or boosting of signal for a particular wavelength. In the case of multiple wavelengths, each cavity exhibits a thickness of a half wave integer multiple of a separate target wavelength. An alternative is utilizing cavities targeted at the same wavelength to provide signal gain and improve transmission and signal/noise. These designs can be combined such that multiple wavelengths are targeted and some or all are also 'boosted' through the thickness of the device. The cavity layers again utilize materials that produce a non-linear response to the incident irradiance to provide an on/off capability.

Figure 5:
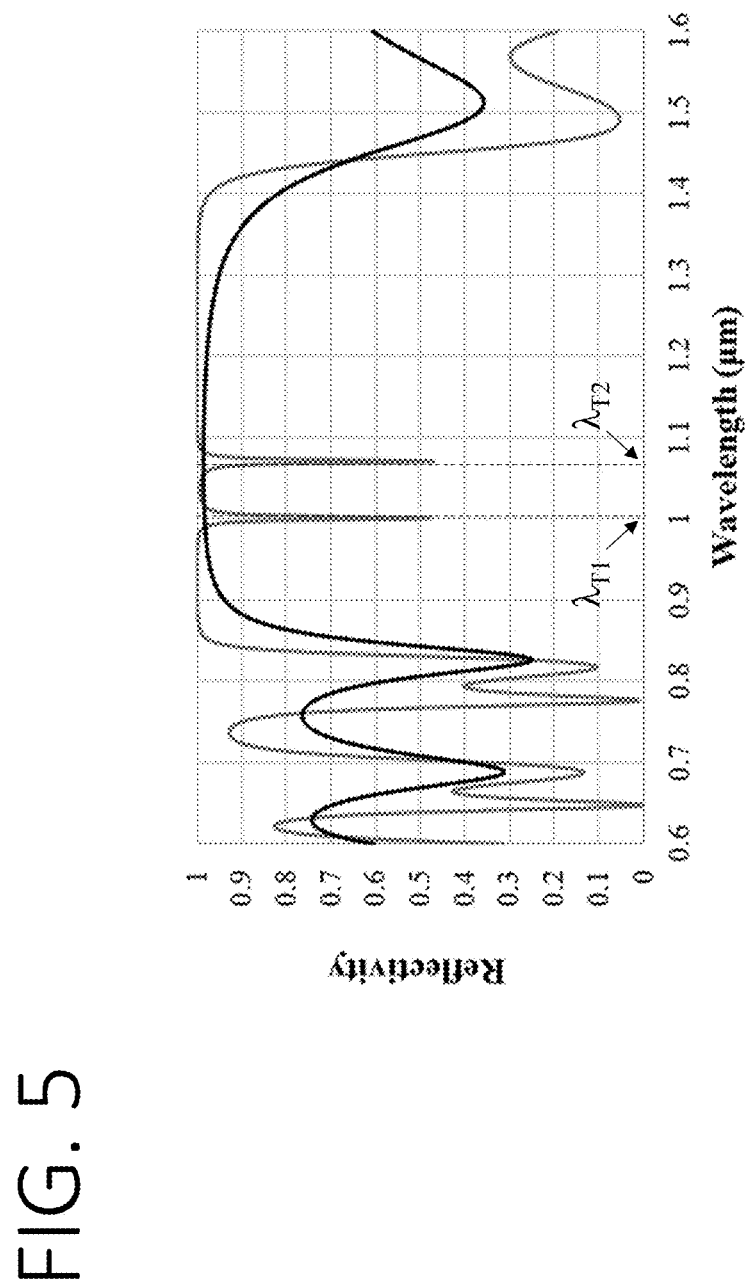
FIG. 5 is a reflectivity spectrum for a multiband device at nominally low and high irradiance.

FIG. 5 provides an example of a reflection spectrum for a non-linear multiband Fabry-Perot device at nominally 'low' and 'high' irradiances, respectively. Similar to FIG. 2, the structure is transmissive at low intensity and reflective at high intensity. However, in this case, the utilization of multiple cavity layers enables transmission at multiple wavelengths targets within the reflection band as shown in FIG. 5, with transmissions shown at $\lambda_{T1}$ and $\lambda_{T2}$. The resonant transmission can again be mitigated at high irradiance by incorporating materials with an appropriate non-linear response in the cavity layers.

It should be noted that the disclosure is not limited to application on a substrate in air and nor is the impingement direction limited. For example, the impinging light at the surface of the device could be traveling through any fluid, or even vacuum, and is not limited to air. Alternatively, the device could be fabricated such that the surface is in contact with a solid and the impinging light could be traveling through said solid. The solid could be a part of a larger device, such as an optical fiber, lens, grating, etc., or simply a coating, such as a layer of paint, lacquer, or other protective layer. Further, the impingement need not necessarily be at the surface of the device. The irradiance could impinge through the substrate and the signal exit the surface. The exiting signal is again not limited to air and could exit into any fluid, vacuum, or solid desired.

The following examples are intended to further illustrate certain example embodiments of the disclosure and are not limiting in nature. Those skilled in the art will recognize, or be able to ascertain, using no more than routine experimentation, numerous equivalents to the specific substances and procedures described herein.

Figure 6:
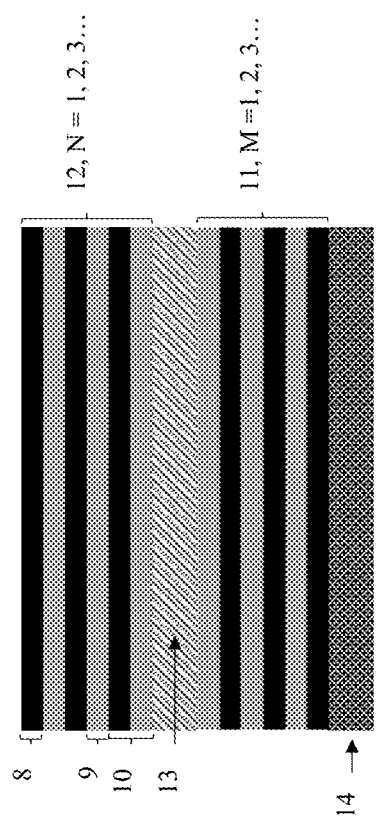
FIG. 6 is a schematic cross section of an intensity dependent non-linear optical filter utilizing DBR mirrors.

FIG. 6 provides an example embodiment wherein the planar reflectors utilize a distributed Bragg reflector (DBR) structure composed of alternating high index 8 and low index 9 materials, each a quarter wave plate nominally $\lambda_c/4\eta$ in thickness, where $\eta$ is the refractive index of the given layer and $\lambda_c$ is the target center band wavelength for the layers. Potential candidate systems include materials, such as, but not limited to, Si, Ge, Al, Fe, Ti, Zr, Hf, Ta, Nb, W, Sc, Ga, In, Sn, Pb, K, Ag, Au, rare earths, and oxides, sulfides, selenides, tellurides, phosphides, arsenides, antimonides, nitrides, and carbides thereof, including multicomponent mixtures of the aforementioned. The alternating layers form bilayers 10, with N and M number of bilayers forming complete stacks 11 and 12, respectively. Between the complete DBR stacks 11 and 12 is the cavity layer 13. The stacks 11 and 12 are ordered such that they are symmetric about the cavity, as demonstrated in FIG. 6. The cavity layer 13 utilizes a material that exhibits a non-linear response to the irradiance, such as a non-linear absorber. For example, a material, such as $WS_2$, $MoS_2$, BN, graphene, or other 2D material, may be used as described above. The thickness of the cavity layer is nominally $l_c$ as described in Eqn. 4. The structure is fabricated onto a substrate (or mirror stack) 14 using any combination of deposition techniques previously mentioned. It should be noted that the ordering of the bilayer stacks 10 can be changed or reverse such that the first layer, e.g., the surface layer or top of FIG. 6, is the low-index material 9. The selection of the first layer may depend, for example, on the desired incidence angle performance and overall transmission behavior, with higher index materials approaching the critical angle faster, and lower index materials enabling transmission of the resonant signal over larger angles. In addition, although a symmetric ordering of the DBRs 11 and 12 immediately about the cavity 13 is required, the number of bilayers N and M in each DBR need not be equivalent. Further, the stacks can include an additional layer at the end of the stack to further tailor the spectra, provided that the symmetric ordering immediately about the cavity is maintained. For example, a stack may include two materials differing in refractive index, A and B, and a non-linear cavity layer C, stacked with two bilayer, such as: ABAB|C|BABA, which could include additional B' outer layers (designated B' for ease of visualization, but may be of the same composition as B in some examples) B'ABAB|C|BABAB' or a single additional layer on either side B'ABAB|C|BABA or ABAB|C|BABAB'. The inverse case switching the order of B and A is also valid, and the final selection of order is dictated by the desired angular performance, cavity material, substrate material, and transmission and reflection characteristics. In addition to the ordering, the target center band wavelength $\lambda_{cM}$ and $\lambda_{cN}$ for the stacks 11 and 12 need not be equivalent, so long as there is sufficient overlap of their respective reflection bands such that the cavity layer 13 target $\lambda_T$ is in an overlapped region. The DBR structure alternations and candidate materials described heretofore are understood to be applicable for any structure herein utilizing a DBR.

Another example embodiment is described with reference to FIGS. 7a and 7b where DBR structures are again employed as the mirrors, but utilize a broadband configuration. In the example structure of FIG. 7a, alternating layers of high index 15 and low index 16 material form bilayers 17 that form stacks 18 and 19 surrounding a cavity layer 24. The stacks are composed of groupings denoted M' 20 and M'' 21 to form stack 18 and groupings N'' 22 and N' 23 to form stack 19, where each grouping has a center band target: $\lambda cM'$, $\lambda_{cM''}$, $\lambda_{cN''}$, and $\lambda_{cN'}$, respectively. These targets are spread about the center of the desired reflection band to enlarge the bandwidth. For example, if M stack 18 targets some wavelength $\lambda_{cM}$, then the groupings M' 20 and M'' 21 can target $\lambda_{CM'}=0.8\lambda_{cM}$ and $\lambda_{cM''}=1.2\lambda_{cM}$. Likewise, if N stack 19 targets some wavelength $\lambda_{cN}$, then the groupings N'' 22 and N' 23 can target $\lambda_{cN''}=1.2\lambda_{cN}$ and $\lambda_{cN'}=0.8\mu_{cN}$. This is depicted schematically in FIG. 7a where M' and N' target shorter wavelengths and require thinner layers, and M'' and N'' target longer wavelengths and require thicker layers. In this manner, the reflection band can be broadened, with an example reflection spectrum of a device utilizing the broadband DBR compared to that of a device utilizing a traditional DBR shown in FIG. 7b. It should be noted that the number of bilayers in the groupings can vary from one to any arbitrary integer or half integer, so long as the alternating order remains consistent. Further, the number of groupings can vary from two to any arbitrary integer, with the total number of bilayers and groupings limited only by the ability to fabricate and the desired spectra. The center band wavelength targets for stack 18 and 19 need not be equivariant, so long as there is sufficient overlap of their respective reflection bands such that the cavity layer 24 target $\lambda T$ is in an overlapped region. Further, the targets of each grouping need not be sequential. It is desirable to have the groupings immediately surrounding the cavity relatively close in target, though this is not always necessary depending on desired reflection and transmission characteristics and overall device structure.

Figure 7A:
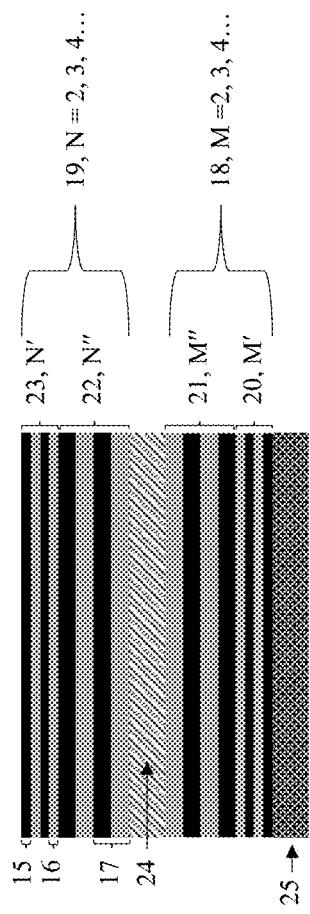
FIG. 7a is a schematic cross section of an intensity dependent non-linear optical filter utilizing DBR mirrors.
Figure 7B:
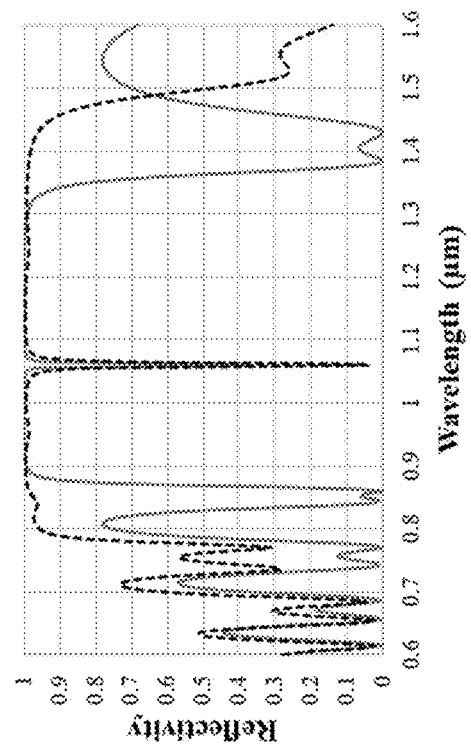
FIG. 7b is a reflectivity spectrum comparing a device of FIG. 7a using broadband DBR reflectors to traditional DBR reflectors.

In certain aspects, the scheme described in FIG. 7a can be modified to produce a graded structure, wherein the stacks are graded from one target wavelength near the cavity, to a second target wavelength near the ends of the device. The grading scheme can be as finite as incrementing the target wavelength each individual layer, or bilayer, or can use groupings of bilayers. The change in target wavelength can be a linear function of the total center band wavelength target change ($\Delta\lambda_c$) divided by the total number of grades (G). For example, if a 100 nm differential is desired over 5 grades, then $\Delta\lambda_c/G=20$ nm/grade, and thus each grade is different by 20 nm, where the grade can be individual layers, bilayers, or bilayer groups. This is a simple example; however, the grading scheme can be more complex and a non-linear function of the grades. It should be understood that the broadband reflectors described herein could be utilized as one or all of the mirrors for the various filters disclosed in the work and are not limited to the described figure.

In another modification of the scheme described in FIG. 7a, the mirrors N and M can be designed and arranged via an algorithmic or metaheuristic approach. This can include methods such as evolutionary algorithms, swarm intelligence, single and multi-trajectory, machine learning, or other computationally derived means. In these cases, the layer ordering does not necessarily utilize groupings or gradients and may instead substantially vary from bilayer to bilayer and even within a bilayer in terms of optical thickness and effective target wavelength.

Figure 8:
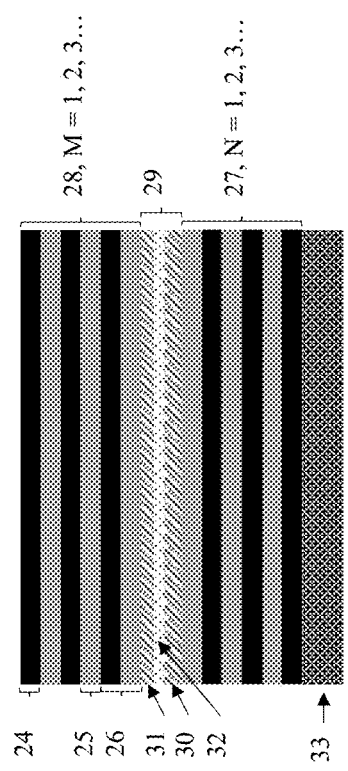
FIG. 8 is a schematic cross section of an intensity dependent non-linear optical filter utilizing DBR mirrors and a cavity layer containing a thin layer of non-linear 2D material.

Yet another example of an optical filter is provided in FIG. 8 where alternating high index 24 and low index 25 materials, each a quarter wave plate nominally $\lambda_c/4\eta$ in thickness, where $\eta$ is the refractive index of the given layer and $\lambda_c$ is the target center wavelength, form bilayers 26. The bilayers create DBR stacks 27 and 28, composed of N and M number of bilayers. The stacks are again placed on either side of a cavity layer 29 whose total thickness $l_c$ is nominally an optical half-wavelength integer multiple of the target transmission wavelength. The cavity layer 29 is composed of three total layers; two outer layers 30 and 31 which are not required to exhibit non-linear behavior, and a thin inner layer 32 that exhibits non-linear behavior. The thickness of the inner non-linear layer 32, $l_i$, is such that the total absorbed energy of the non-linear layer is proportional to that of the incident irradiance at the desired limiting irradiance. The limiting irradiance represents the point at which cavity resonance is suppressed and transmission drops to near zero. Above the limiting irradiance, continued resonance of the cavity and buildup of intensity would cause the inner layer to absorb more energy than the incident beam, and therefore the resonance becomes suppressed. The thickness of the non-linear layer is therefore a function of the non-linearity in the material and the desired limiting threshold. For example, in the case of non-linear absorption, the thickness of the inner layer would be calculated based on the target limiting irradiance, $I_{lim}$, which produces a resonant irradiance, $I_{res}$, which then yields a resultant $\beta$ value in the non-linear layer. This subsequently enables calculation of the absorbance, and therefore the necessary thickness such that the total absorbed energy is nominally that of the incident beam. The outer layers 29 and 30 are equivalent in thickness with a combined thickness of the outer layers and inner layer equal to $l_c$, an integer multiple of the optical half-wavelength. This structure is fabricated onto a substrate 33 using any combination of the deposition techniques previously mentioned. This cavity layer structure enables tailoring of limiting threshold by modifying the non-linear layer composition and/or thickness, while maintaining a target transmission wavelength. In the case of a traditional cavity layers, the entire cavity is nominally the same material and thus thickness (and therefore limiting threshold) cannot be modified without modifying the transmission wavelength. This provides a functionality not capable in other designs utilizing non-linear materials as the cavity layer.

Figure 9:
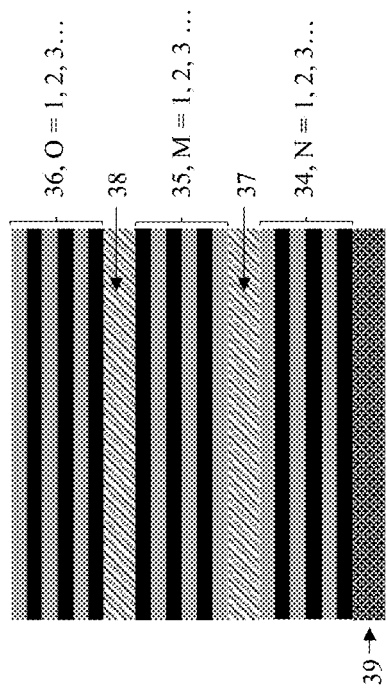
FIG. 9 is a schematic cross section of an intensity dependent non-linear optical filter with multiband transmission utilizing DBR mirrors.
Figure 10:
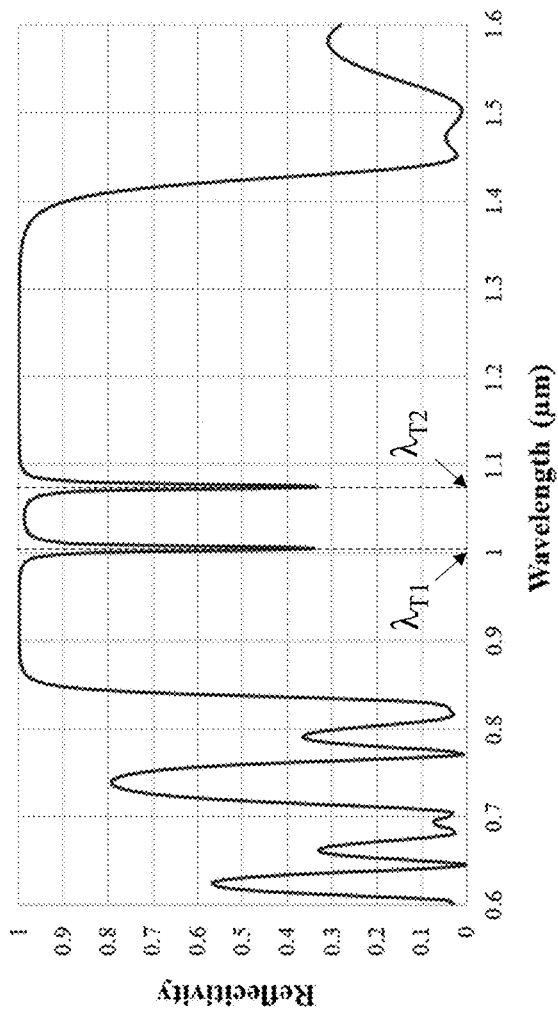
FIG. 10 is a reflectivity spectrum for a multiband device targeted at two wavelengths, $\lambda_{T1}$ and $\lambda_{T2}$.

In yet another embodiment shown in FIG. 9, two DBRs 34 and 35 surround a cavity layer 37. Upon the outer DBR 35 an addition cavity layer 38 is deposited, upon which a final DBR stack 36 is deposited. This entire structure is fabricated on a substrate 39, using any of the methods described previously. The alternations of the DBR structures discussed previously may again be used here, where the number of bilayers N, M, and O, of DBRS 34, 35, and 36 need not be equivalent, nor their targets $\lambda_{cN}$, $\lambda_{cM}$, $\lambda_{cO}$. Further, additional layers may be included in the stacks, so long as the same material is utilized on either side of a given cavity and ordering is maintained. The cavity layers 37 and 38 are again composed of materials that produce a non-linear response to the incident irradiance and are of thickness $l_{c37}$ and $l_{c38}$, with each thickness satisfying Eqn. 4 for the desired angles $\theta_{37}$ and $\theta_{38}$ and wavelength $\lambda_{T37}$ and $\lambda_{T38}$ with the given refractive indices $\eta_{37}$ and $\eta_{38}$. FIG. 10 provides an example reflectivity plot for such a device targeted at two wavelengths, $\lambda_{T1}$ and $\lambda_{T2}$. The resulting spectra confirms multiple passbands within the stopband. In this manner, a device can be tailored to enable transmission of multiple wavelengths within the band. It is understood that the broadband cavity modifications discussed previously are applicable to these structures. The passband bandwidth or FHWM, as well as transmission amplitude and transmission amplitude ratios of the various passbands can be tailored by altering the ordering and material properties.

Figure 11:
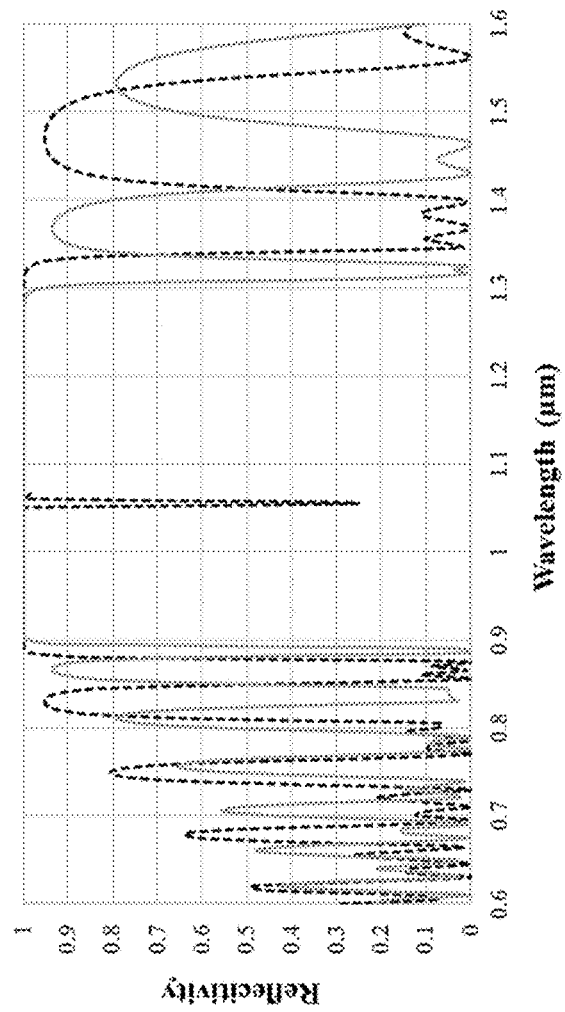
FIG. 11 is a reflectivity spectrum comparing a multiband device using transmission band gain in accordance with an example embodiment of the present disclosure, compared to a traditional Fabry-Perot device with only a single cavity, each with roughly the same total number of bilayers.

One aspect of the structure in FIG. 9 is a pumped cavity, wherein the signal from the first cavity can be amplified by a subsequent cavity. In this case, $\lambda_{T37}=\lambda_{T38}$ and $\theta_{37}=\theta_{38}$. This is useful to provide transmission in highly reflective mirrors. From Eqn. 3, as the total number of bilayers N increases, the reflectivity R increases. However, the cavity transmission is reduced as N increases and is eventually reduced to zero due to the significant attenuation of the forward propagating wave in the second mirror. In practice, this suppression can occur in as few as 5-10 bilayers for each stack. However, by introducing a second cavity layer, the intensity can be magnified a second instance to a sufficiently high degree as to enable transmission. An example of this is shown in FIG. 11 comparing a 9×9 (number of bilayers in each stack) single cavity device to a 6×6.5×6 two-cavity device. Though each device contains a total of 18 bilayers with the same center band target wavelength ($\lambda_c$), and therefore similar bandwidth and reflectivity, the additional cavity in the 6×6.5×6 multiband structure enables transmission. Thus, by controlling the number of cavity layers and mirror strength, a structure similar to that of FIG. 9 can be tailored to produce nearly any amount of transmission for a particular wavelength within the reflection band. It should be noted that additional cavity layers and reflectors can be incorporated so as to enable transmission of multiple wavelengths, angles, or both, and pumping of one or more of those wavelengths or angles.

Figure 12:
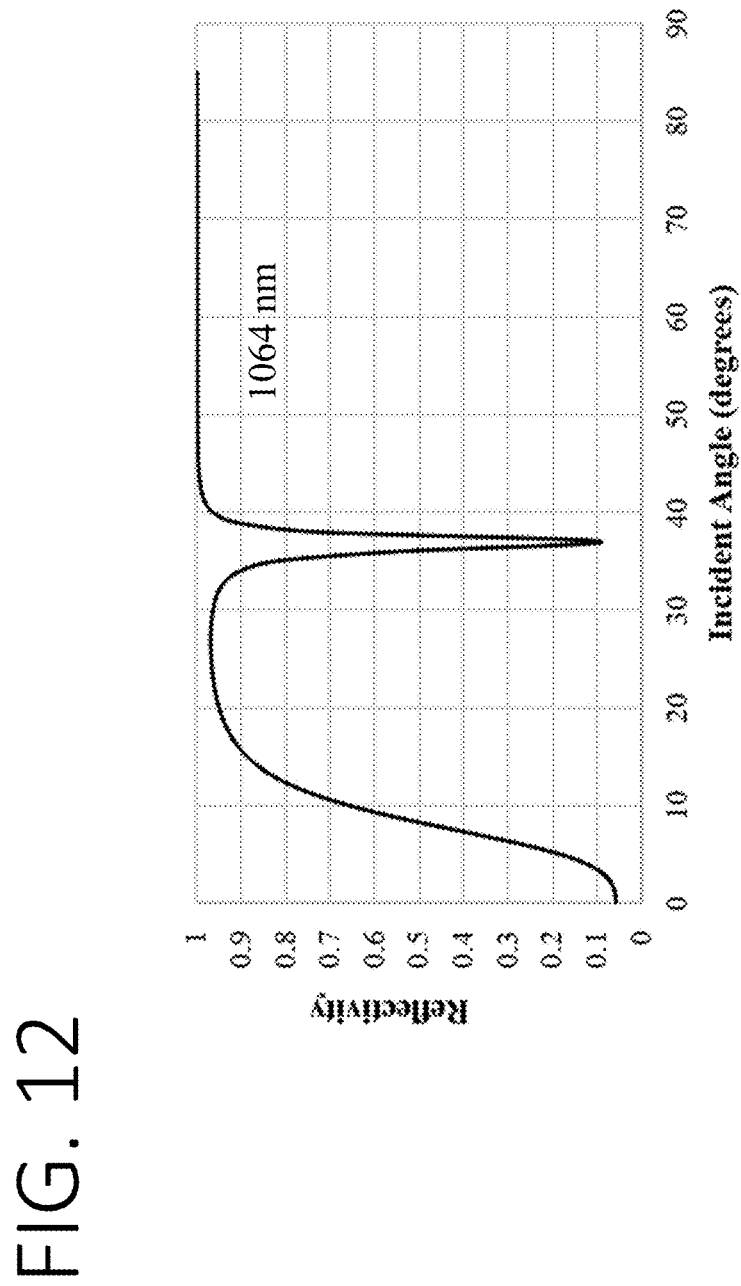
FIG. 12 is a reflectivity spectrum at a constant wavelength and given as a function of angle of incidence for a multiband device targeting the same wavelength at two incidence angles in accordance with an example embodiment of the present disclosure.

Another aspect of the structure in FIG. 9 is an angular sweep cavity, wherein the same target wavelength is utilized for both cavities, $\lambda_{T37}=\lambda_{T38}$, but the target angle is different $\theta_{37}$ $\theta_{38}$. In this manner, the angular sensitivity of the device can be modified by incorporating multiple passbands tailored for different angular regions. This is shown in FIG. 12 where a 3×3.5×3 device is targeting transmission at $\lambda_{T3}$ and using mirrors all targeted at the same $\lambda_c$, but with one cavity targeting $\theta=90$ (normal incidence in this case) and the other cavity targeting $\theta=62$. The angular sweep in FIG. 12 demonstrates the improved transmission of the multicavity structure over multiple angles at the target wavelength $\lambda T_3$. This sweep can be further modified by incorporating additional cavities or reducing the angular distance to provide a broader angular reflection, as well as modification of the cavity layer refractive index. From Snell's Law, higher index materials produce less refraction, and therefore are slightly less sensitive to incident angle.

Only example embodiments of the present disclosure are shown and described in the present disclosure. It is to be understood that embodiments of the present disclosure are capable of use in various other combinations and environments and is capable of changes or modifications within the scope of the inventive concepts as expressed herein. Thus, for example, those skilled in the art will recognize, or be able to ascertain, using no more than routine experimentation, numerous equivalents to the specific substances, procedures and arrangements described herein. Such equivalents are considered to be within the scope of this disclosure, and are covered by the following claims.

What is claimed is:

1. An optical filter, comprising:
a substrate;
a first mirror on the substrate;
a cavity layer on the first mirror; and
a second mirror on the cavity layer,
wherein each of the first and second mirrors provide high reflection, low transmission and low absorption over a targeted stopband,
wherein the cavity layer defines a resonant transmission band within the targeted stopband with the resonant band wavelength depending on the optical thickness of the cavity layer,
wherein the cavity layer includes a material having a non-linear response to incident irradiance such that cavity absorption changes with irradiance and suppresses cavity resonance at high irradiance, and
wherein the material having the non-linear response to the incident irradiance includes a two-dimensional (2D) material.

2. The optical filter of claim 1, wherein the 2D material comprises a transition metal dichalcogenide (TMD), $WS_2$, $MoS_2$, a solid solution of TMD, BN, a borocarbonitride, a graphene-based carbonaceous material, or a mixture of one or more thereof.

3. The optical filter of claim 1, wherein the first and second mirrors includes at least one of distributed Bragg reflectors (DBRs), broadband distributed Bragg reflectors (DBRs), rugate gradient mirrors, broadband rugate gradient mirrors, and/or metallic reflectors.

4. The optical filter of claim 1, wherein the non-linear absorption coefficient of the 2D material is larger than $1\times10^2$ cm/GW.

5. The optical filter of claim 1, wherein the non-linear absorption coefficient of the 2D material is larger than $1\times10^3$ cm/GW.

6. The optical filter of claim 1, wherein the 2D material is provided as a layer having a thickness between 1 nm and 1 μm.

7. An optical filter, comprising:
a substrate;
a first mirror on the substrate;
a cavity layer on the first mirror; and
a second mirror on the cavity layer,
wherein each of the first and second mirrors provide high reflection, low transmission, and low absorption over a targeted stopband,
wherein the cavity layer defines a resonant transmission band within the targeted stopband with the resonant band wavelength depending on the optical thickness of the cavity layer, and
wherein the cavity layer includes a plurality of layer comprising:
a non-linear layer having a thickness less than a wavelength of the targeted stopband, the non-linear layer comprising a material having a non-linear response to incident irradiance such that cavity absorption changes with irradiance and suppresses cavity resonance at high irradiance, and the material having the non-linear response to the incident irradiance is a two-dimensional (2D) material, and
outer layers respectively on opposing sides of the non-linear layer.

8. The optical filter of claim 7, wherein the 2D material comprises a transition metal dichalcogenide (TMD), $WS_2$, $MoS_2$, a solid solution of TMD, BN, a borocarbonitride, a graphene-based carbonaceous material, or a mixture of one or more thereof.

9. The optical filter of claim 7, wherein the first and second mirrors includes at least one of distributed Bragg reflectors (DBRs), broadband distributed Bragg reflectors (DBRs), rugate gradient mirrors, broadband rugate gradient mirrors, and/or metallic reflectors.

10. The optical filter of claim 7, wherein the non-linear absorption coefficient of the 2D material is larger than $1\times10^2$ cm/GW.

11. The optical filter of claim 7, wherein the non-linear absorption coefficient of the 2D material is larger than $1\times10^3$ cm/GW.

12. The optical filter of claim 7, wherein the 2D material is provided as a layer having a thickness between 1 nm and 1 μm.

13. An optical filter, comprising:
a substrate;
a first mirror on the substrate;
a first cavity layer on the first mirror;
a second mirror on the first cavity layer; and
a second cavity layer on the second mirror;
a third mirror layer on the second cavity layer,
wherein each of the first, second, and third mirrors provide high reflection, low transmission, and low absorption over a targeted stopband,
wherein the first and second cavity layer define first and second resonant transmission bands, respectively, within the targeted stopband with a resonant band wavelength of each of the first and second resonant transmission bands depending on the optical thickness of the first and second cavity layers, respectively,
wherein the first and second cavity layers respectively include first and second materials each having a non-linear response to incident irradiance such that cavity absorption changes with irradiance and suppresses cavity resonance at high irradiance, and
wherein each of the first and second materials having the non-linear response to the incident irradiance includes a two-dimensional (2D) material.

14. The optical filter of claim 13, further comprising
a third cavity layer on the third mirror;
a fourth mirror layer on the second cavity layer,
wherein the third cavity layer includes a respective 2D material having a non-linear response to incident irradiance.

15. The optical filter of claim 14, wherein the first, second, and third mirrors includes at least one of distributed Bragg reflectors (DBRs), broadband distributed Bragg reflectors (DBRs), rugate gradient mirrors, broadband rugate gradient mirrors, and metallic reflectors.

16. The optical filter of claim 14, wherein at least two of the first, second, and third cavity layers target at least two different resonant band wavelengths such that the optical filter provides at least two separate passbands.

17. The optical filter of claim 14, wherein at least two of the first, second, and third cavity layers target a same resonant band wavelength and a same incidence angle to provide transmission gain through the layers.

18. The optical filter of claim 14, wherein at least two of the first, second, and third cavity layers target a same resonant band wavelength but at different incidence angles such that angular sensitivity is reduced.

19. The optical filter of claim 14, wherein the 2D material of each one of the first, second, and third cavity layers comprises at least one of a transition metal dichalcogenide (TMD), $WS_2$, $MoS_2$, a solid solution of TMD, a borocarbonitride, a graphene-based carbonaceous material, and/or BN.

20. The optical filter of claim 13, wherein the 2D material of each one of the first and second cavity layers comprises at least one of a transition metal dichalcogenide (TMD), $WS_2$, $MoS_2$, a solid solution of TMD, a borocarbonitride, a graphene-based carbonaceous material, and/or BN.

\* \* \* \* \*